United States Patent [19]

Fujinami et al.

[11] 4,341,628
[45] Jul. 27, 1982

[54] BELT PRESSURE FILTER

[75] Inventors: Susumu Fujinami, Kobe; Hiroaki Miyamoto, Kashihara; Ryoichi Morimine, Nara; Toshiki Fukuzawa, Osaka; Toshihiko Ueda, Suita; Shoji Umakoshi, Osaka; Kiyohiko Tokunaga, Ikoma, all of Japan

[73] Assignee: Kubota Ltd., Osaka, Japan

[21] Appl. No.: 228,913

[22] Filed: Jan. 27, 1981

[30] Foreign Application Priority Data

Jan. 30, 1980 [JP] Japan ..................... 55/9806

[51] Int. Cl.³ .......................................... B01D 33/04
[52] U.S. Cl. .................... 210/101; 210/103; 210/216; 210/401
[58] Field of Search ............... 210/709, 740, 744, 103, 210/104, 96.1, 216, 386, 401

[56] References Cited

U.S. PATENT DOCUMENTS

| | | | |
|---|---|---|---|
| 3,348,682 | 10/1967 | Aulich et al. | 210/740 |
| 3,699,881 | 10/1972 | Levin et al. | 210/386 X |
| 3,748,263 | 7/1973 | Stobe | 210/86 X |
| 4,151,080 | 4/1979 | Zuckeroran et al. | 210/96.1 |
| 4,282,093 | 8/1981 | Haga et al. | 210/709 X |

Primary Examiner—John Adee
Attorney, Agent, or Firm—W. G. Fasse; D. H. Kane, Jr.

[57] ABSTRACT

A belt pressure filter comprises a gravity dewatering zone for dewatering a sludge as a function of the gravity and a forced dewatering zone for a forced dewatering of the sludge by means of external pressure. An endless filter belt travels from the gravity dewatering zone to the forced dewatering zone. The coagulated sludge is supplied onto the filter belt by means of the gravity dewatering zone. Information representing the level of the sludge deposited on the belt is obtained as an information concerning the dewatering ability of the coagulated sludge supplied onto the filter belt. The traveling speed of the filter belt is calculated and controlled on the basis of the above described level information which represents the layer thickness and hence also the solids concentration. The optimum amount of a dosage of a coagulating agent is determined based on the traveling speed of the filter belt as calculated. As a result, the water content in a dewatered cake is maintained low and constant, while an optimal amount of coagulating agent most suited to the sludge characteristics at that time is added to the material without wasting any excess coagulating agent.

13 Claims, 15 Drawing Figures

```
         B
         ↓
S8 ┌─────────────────────┐
   │ FILTER BELT TRAVELING│
   │ SPEED IS DETERMINED  │
   │ BASED ON PREVIDUS THICK-│
   │ NESS AND CURRENT     │
   │ THICKNESS            │
   └─────────────────────┘
         ↓
S9   ╱TRAVELING╲   YES
   ╱ SPEED HAS INCREASED ╲──────→ C
   ╲   THREE TIMES      ╱
    ╲      ?          ╱
         ↓ NO
S10  ╱TRAVELING╲  NO
   ╱ SPEED IS LOWER ╲───────
   ╲   THAN VH     ╱
         ↓ YES
S11   ╱  IN  ╲    NO
    ╱ A CONTROL CYCLE ╲────
    ╲    TIME?       ╱
         ↓ YES
         F              G
```

FIG. 6A-(3)

```
         D
         ↓
S14 ┌─────────────────────┐
    │ FILTER BELT TRAVELING│
    │ SPEED & COAGULATING  │
    │ AGENT DOSAGE ARE     │
    │ CALCULATED           │
    └─────────────────────┘
         ↓
         A

S15 ┌─────────────────────┐
    │ 1) INCREASE COAGULAT-│
    │    ING AGENT        │
    │ 2) TIMER START      │
    └─────────────────────┘
         ↓
S16  ╱  TIME  ╲
    ╱ PERIOD HAS TIMED ╲
    ╲      UP?        ╱
         ↓
S17 ┌─────────────────────┐
    │ DECREASE SLUDGE     │
    │       FLOW RATE     │
    └─────────────────────┘
         ↓
         H
```

FIG. 9

BELT PRESSURE FILTER

BACKGROUND OF THE INVENTION

The present invention relates to a belt pressure filter suited for treatment of a sludge or the like produced in various types of water treatment facilities. More specifically, the present invention relates to a belt pressure filter which is capable of an automatic treatment in such a manner that in spite of variations in the sludge characteristics, such as the concentration of organic substances, the water content of a dewatered cake may be maintained relatively low and constant while the dosage of a coagulating agent that is added to a raw sludge solution may be maintained at an optimum and an abnormal condition, such as poor coagulation can be readily discovered.

A belt pressure filter is a kind of a dewatering machine often used in a dewatering process and may be classified as a filtration type dewatering machine using a filter belt. Since a belt pressure filter employs a belt press type sludge dewatering system using mesh like filter belts and rolls, the driving power may be small and any increase in the amount of solid matter through injection of an agent, is small, so that a cake having a small water content can be obtained. Therefore, attention has been attracted to such a system since it fully meets the requirement of saving energy. Generally, a belt pressure filter comprises a gravity dewatering zone for dewatering a sludge by gravity, a roller press dewatering zone for dewatering the sludge by means of a roller press, a compressive dewatering zone for dewatering the sludge by compressive force, and a shearing stress dewatering zone for dewatering the sludge by a shearing stress. A belt pressure filter comprises basically two mesh-like filter belts and rollers. This type of belt pressure filter needs to take into consideration, as the factors being controlled, four factors, i.e. the filter belt traveling speed, the sludge concentration as a typical factor representing a sludge characteristic dosage of an agent being dosed or a dosage of a coagulating agent, and the amount or quantity of sludge being supplied. It is desired that these factors are properly controlled so that the water content of a dewatered cake is maintained low and constant and in addition the dosage of a coagulating agent is maintained as low as possible. The present invention achieves such purposes.

More specifically, the characteristics of a material being supplied to a dewatering machine for the purpose of processing may vary. The amount or concentration of solids in a sludge or the amount of organic substance and the number of particles in a sludge may vary. Therefore, even if the amount of supplied material to be processed is maintained constant, a difference in the filtration amount may be caused in the gravity dewatering zone. Accordingly, the thickness of the material supplied from a source material supply tank onto a filter belt may be changeable. Usually, it is desired to make uniform the layer thickness throughout the width of the material as it is supplied from the gravity dewatering zone onto a forced dewatering zone comprising a roller press dewatering zone. Therefore, rollers are provided at the entrance of the forced dewatering zone for the purpose of adjusting the layer thickness of the material being processed. However, other means for adjusting such layer thickness may be provided. Accordingly, if and when the concentration of the solids in the sludge material becomes too high and/or a poor coagulation is present or when the amount of sludge being processed increases, the material being processed may cause a congestion at the roller for adjusting the layer thickness, which could cause a leakage of the material. On the other hand, if and when the amount of the material being processed is decreased, i.e. when the concentration of the solid material is low and/or a poor coagulation is present, it could happen that a desired water content cannot be attained. Thus, there is a problem that the dewatering performance or efficiency is lowered due to a change in the sludge characteristics mainly due to a change in the concentration of the solid material components of the sludge. If the concentration of solids changes, it is necessary to determine the dosage of a coagulating agent in association with or as a function of the solids concentration. If the dosage of a coagulating agent is maintained constant, it could happen that the dewatering performance or efficiency is lowered or too large a dosage of a coagulating agent exceeding a required amount would cause an uneconomical waste of agent.

SUMMARY OF THE INVENTION

The belt pressure filter according to the invention comprises a gravity dewatering zone for dewatering a material to be processed or dewatered by gravity, and a forced dewatering zone for pressure material. An endless filter belt is disposed to travel from the gravity dewatering zone to the forced or pressure dewatering zone. A constant flow rate of the material is supplied to the gravity dewatering zone. Information concerning the sludge characteristics, mainly the concentration of the solids material per volume is obtained for control purposes. The information concerning various changes of the sludge, such as its coagulation condition, the amount of organic substances and the like may be included as information associated with the concentration information. The traveling speed of the filter belt is controlled so that the speed is substantially proportional to said solids concentration, whereby the water content of the material after dewatering is made uniform.

In a preferred embodiment of the present invention, means is provided in the above described gravity dewatering zone for detecting the thickness of the material layer deposited on the above described filter belt. This information is used in the same wasy as the solids concentration associated information. Preferably, the thickness detecting means comprises at least a first level sensor for detecting a layer thickness which exceeds a predetermined lower limit, and a second level sensor for detecting a layer thickness exceeding a predetermined upper limit. The information representing the layer thickness is determined as a combination of the logical outputs of the first level sensor and of the second level sensor. The traveling speed of the filter belt is controlled so that the traveling speed is increased when to the information representing the thickness is exceeding said upper limit until the layer thickness on the filter belt is between the above lower and upper limits. The traveling speed of the filter belt is decreased when the information representing the thickness is smaller than the lower limit until the layer thickness on the filter belt is again between the lower and upper limits.

In a further preferred embodiment of the present invention, a coagulating agent for coagulating the material being processed is supplied to the gravity dewatering zone and mixed into the material being processed. It has been observed that a predetermined functional relationship exists between the solids concentration of the material being processed and the optimum dosage of a coagulating agent. Such functional relationship is stored in advance in a memory means. The optimum amount of a coagulating agent being dosed is evaluated in response to the solids concentration associated information and based on the function stored in memory means.

In another preferred embodiment of the present invention, an endless filter belt is adapted such that the same may travel at a constant speed.

Accordingly, it is a main object of the present invention to provide a belt pressure filter which is automatically controlled to assure a constant water content of a cake obtained by a dewatering process in spite of any change in the solids concentration of the material being processed.

Another object of the present invention is to provide a belt pressure filter which is capable of automatically dosing an optimum amount of a coagulating agent in accordance with a change of the solids concentration of a material being processed.

A further object of the present invention is to provide a belt pressure filter which is capable of automatically controlling the dosage of a coagulating agent to make the dosage optimal, while the water content of a cake obtained by the dewatering process is maintained low and constant, in spite of any change in the solids concentration of the material being processed.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
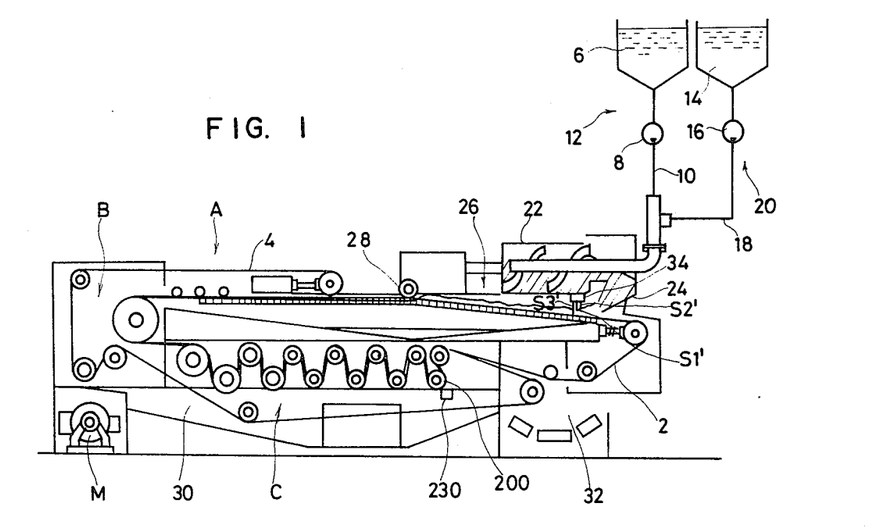
FIG. 1 shows a structural side view of a belt pressure filter which constitutes the background of the invention.

FIG. 1 is a view showing a mechanical structure of a belt pressure filter which constitutes the background of the invention. The belt pressure filter shown basically comprises a first endless filter belt 2, and a second endless filter belt 4 disposed in partial contact with the first filter belt 2. The first and second filter belts 2 and 4 are advanced by means of suitable drive and guide rollers.

The belt pressure filter also comprises a source material supply means 12 for supplying a source material to be processed such as a sludge, a coagulating agent supply means 20 for supplying a coagulating agent for coagulating the material, and a rotary mixer 22 for mixing the material and the coagulating agent. The material supplying means 12 comprises a reservoir 6 for storing and supplying the material and a pipe line 10 coupled to the reservoir 6 through a capacity variable pump 8. The coagulating agent supplying means 20 similarly comprises a coagulating agent reservoir 14 and a pipe line 18 coupled to the coagulating agent reservoir 14 through a capacity variable pump 16. The rotary mixer 22 mixes the supplied material and the coagulating agent and supplies the mixture onto the above described first filter belt 2 at a constant flow rate.

A gravity dewatering portion 26 is formed between the first filter belt 2, the case side walls, and the partition wall 24 of the filter for removing by gravity the water from the mixed material. An adjusting means such as a layer thickness adjusting roller 28 for adjusting the thickness of the material on the first filter belt 2 is provided downstream of the gravity dewatering portion 26 as viewed in the traveling direction of the first filter belt. Furthermore, the second filter belt 4 is located downstream of the first filter belt in the traveling direction so that the first and second filter belts 2 and 4 sandwich the sludge having the layer thickness made constant by the thickness adjusting roller 28. Between the roller 28 and the point where the dewatered cake is finally discharged, the first and second filter belts 2 and 4 are urged toward each other. For simplicity of description, the portion where the first and second filter belts 2 and 4 are urged toward each other is referred to as a forced dewatering portion 30 which comprises a roller press dewatering zone A in a linear path, a compressive dewatering zone B in a large diameter arcuate path passing through a roller 5 of a large diameter, and shear dewatering zone C disposed to pass through a number of rollers in a zigzag manner. The diameters of a number of rollers disposed in the shear dewatering zone C are selected to become smaller from the input end of the zone toward the output end of the zone. The dewatering principles at the respective zones A, B and C will be described below in more detail.

Basically the sludge supplied from the rotary mixer 22 to the first filter belt 2 is dewatered in the gravity dewatering portion 26 through its own weight. Furthermore, the sludge adjusted to a predetermined layer thickness by the thickness adjusting roller 28 is fed to the forced dewatering portion 30 by the movement of the first filter belt 2 whereby the sludge material being processed is dewatered by compression exerted by the rollers. The pressure dewatered cake is finally fed to the discharging portion 32, where the first and second filter belts 2 and 4 are separated whereby the dewatered cake is discharged.

Now the dewatering principle at the above described respective zones will be briefly described. First, in the gravity dewatering zone 26 the first filter belt 2 of a mesh structure functions as a strainer and the sludge flock remains on the inclined filter belts, while the free water is removed as a filtrate by gravity. The amount of water produced by such a dewatering process is largely influenced by the amount of a coagulating agent which is mixed into a sludge. For example, generally the water content of sewage slude after passing through the gravity dewatering zone 26, is approximately 90%. Then the sludge is adjusted in the roller press dewatering zone A by the layer thickness adjusting roller 28 to a cake layer of a specified uniform thickness which may differ depending on the nature of the sludge. The compression of the sludge reduces its volume since large gaps between the sludge flocks or flakes are reduced. Since the sludge is fed downstream of the roller 28 while the same is rotated, the dewatering effect is increased. In addition, the travel of the filter belts is stabilized by preventing wrinkles from occurring in the belts. Then the sludge is further pressed from above and below for dewatering by a relatively weak force exerted by pressure rollers disposed so that the gap between the first and second filter belts 2, 4 is gradually decreased. In the case of a sewage sludge, the water content of the cake at the end of this zone is approximately 80 to 86%. Since the sludge has increased its own plasticity to assume a real cake form by the time when the same reaches the compression stage in the pressing zone B, a compressive force is applied to the cake by tensioning the filter belts and by the rollers 5 having a large diameter, whereby the dewatering operation is expedited. In the case of a sewage sludge, the water content of the cake at the end of this process is approximately 80 to 83%. In the following shear dewatering zone C the dewatering operation is performed by the maximum compressing force and by an auxiliary shearing force. More specifically, since the inner and outer filter belts 2, 4 are advanced at the same traveling speed, a displacement is caused between the inner and outer filter belts due to the layer thickness of the cake when the roller is rotated and the above described shearing stress is applied to the cake between the belts to said displacement, whereby the dewatering operation of the compressed cake is further expedited. In the case of a sewage sludge, the water content of the finally obtained cake is approximately 68 to 80%.

A level meter 34 or layer thickness is provided at the start of the above described gravity dewatering portion 26 for the purpose of detecting the layer thickness of the material deposited on the filter belt 2. The level meter 34 comprises a long sensor S1' for detecting a small layer thickness and a short sensor S2' for detecting a large layer thickness. These sensors S1' and S2' are selected to be of such lengths that only the long sensor S1' becomes operable when the thickness of the material is in a normal range and the long sensor S1 does not become operable or both the long and short sensors S1' and S2' become operable when the layer thickness of the material or the belt 2 is in an abnormal state. Preferably such level meter may comprise an electrode type level switch. To this end, the longest sensor S3' which serves as a common electrode is provided. The purpose of employing the level meter 34 is to detect the solids concentration of the material or the filter belt 2. The input weight of the sludge supplied from the mixer 22 is maintained constant in the embodiment shown. Therefore, assuming that the traveling speed of the filter belt is also constant, the higher the concentration of the solids in the sludge the larger or higher is the layer thickness of the sludge deposited on the filter belt 2 and vice versa. More specifically, the solids concentration of the sludge is proportional to the level of the sludge deposited on the filter belt 2. Accordingly, measuring of the level or layer thickness provides in effect the solids concentration of the sludge. According to the present invention, the traveling speed of the filter belt is controlled in response to the detection of the layer thickness of the sludge in the gravity dewatering portion and thus responsive to the solids concentration of the sludge supplied by the rotary mixer 22, so that the water content in the cake may be maintained constant. The manner of such control will be more apparent from the following description in conjunction with FIG. 2 and the following figures.

Figure 2:
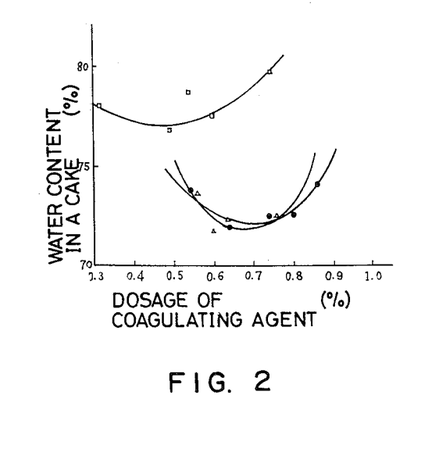
FIG. 2 is a graph showing the relationship between the water content of a cake and the dosage of a coagulating agent.
Figure 3:
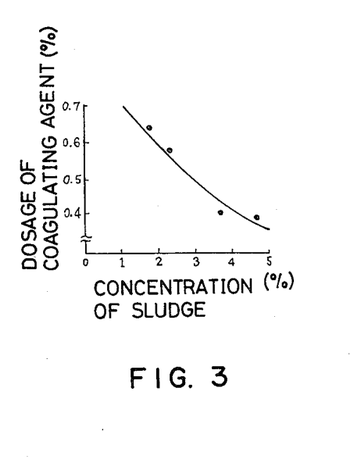
FIG. 3 is a graph showing the relationship between the dosage of a coagulating agent and the solid concentration of a sludge.

As described above, the invention takes the following four factors into account for controlling the belt pressure filter, i.e. the filter belt traveling speed, the sludge solids concentration, the dosage of the coagulating agent, and the amount of the sludge supply. The last mentioned factor of the sludge supply amount is set to be constant. Accordingly, it is important to first explain the correlation of the first three factors. As described previously, in consideration of subsequent process steps, it is desired to maintain the water content of dewatered cake as constant and as low as possible. It has been observed that the water content of the cake is a function of the coagulating agent dosage, of the effectiveness of the coagulating agent and of the filter belt speed. FIG. 2 is a graph showing the relation between the water content in a cake and the dosage of a coagulating agent. As seen from the graph, the curve of water content as a function of dosage differs depending on the kinds of sludge. The optimum dosage accordingly also differs depending on the kinds of sludge. By development of the relation shown in FIG. 2, a relation between the coagulating agent dosage and the sludge concentration as shown in FIG. 3 is obtained. It is clear from FIG. 3 that the coagulating agent dosage is inversely proportional to the sludge concentration. With the just described relationship in mind, the present invention will be more specifically described in the following.

According to the present invention, it is assumed that quanitity of supplied sludge is maintained constant. On the other hand, the sludge concentration is changeable or variable. Accordingly, the quantity of solids contained in the sludge is changeable in proportion to the concentration of the sludge. Assuming that the travling speed of the filter belt is maintained constant, then the water content in a dewatered cake is inversely proportional to the concentration of the sludge. More specifically, the higher the concentration the lower the water content. Therefore, if the concentration of the sludge is increased, the traveling speed of the filter belt is to be increased, if the concentration of the sludge is decreased, the traveling speed of the filter belt is to be slowed down, in order to maintain the water content constant. For this purpose it is necessary to make the filter belt traveling speed proportional to the solids concentration of the sludge. Conversely, if the traveling speed of the filter belt is determined, then accordingly the concentration of the sludge being supplied is determined. Therefore, if the concentration of the sludge is determined, then the optimum dosage of a coagulating agent is determined from the relation shown in FIG. 3

Since the flow rate of the sludge being supplied is kept constant and the concentration of the sludge as determined is substantially the quantity of solids in the sludge, the required dosage of a coagulating agent is determined by determining the optimum dosage.

According to the present invention, attention is paid to the above described correlation. At the outset information associated with the solids concentration of the sludge is obtained in the form of the layer thickness of the material deposited on the first traveling filter belt 2 (FIG. 1) in the embodiment shown. Then the traveling speed of the filter belt is controlled based on that information so that the belt speed is proportional to the concentration of the sludge. Then the optimum dosage of a coagulating agent is determined from said traveling speed of the filter belt and added or dosed into the rotary mixer 22, whereby the water content in a dewatered cake is low and constant while the optimum dosage of the coagulating agent is based on the solids concentration of the sludge.

Figure 4:
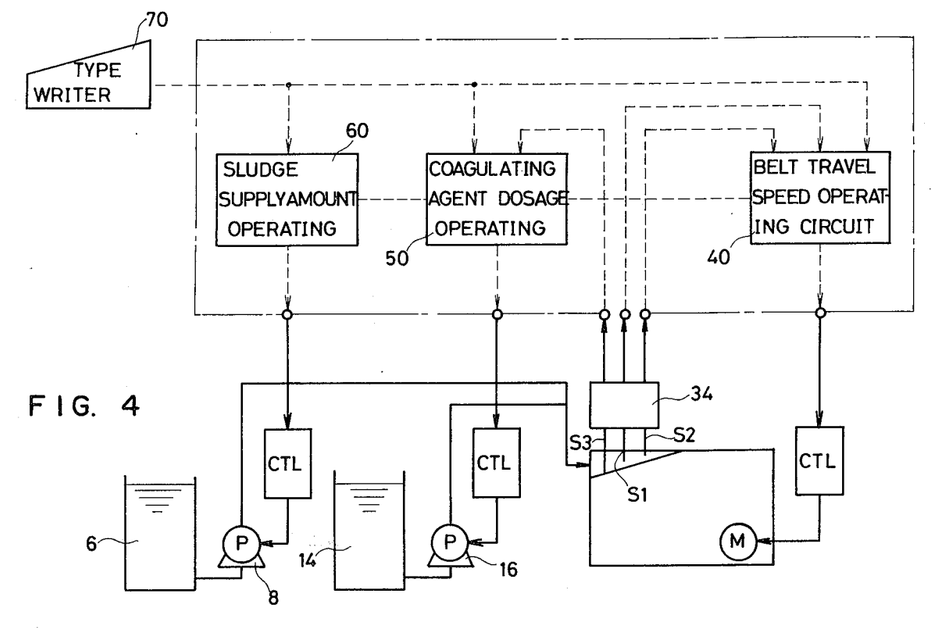
FIG. 4 is a view showing the structure of a belt pressure filter in accordance with one embodiment of the present invention, including a belt pressure filter main body and an automatic control circuit.

FIG. 4 is a view showing the whole structure of the belt pressure filter in accordance with one embodiment of the present invention and comprises a belt pressure filter main portion and an automatic control circuit. The same portions have been denoted by the same reference characters as used in FIG. 1. Basically, the FIG. 4 embodiment comprises a belt pressure filter, and a computer portion for automatically controlling the belt pressure. The digital outputs obtained from the sensors S1 and S2 of the level meter 34 are applied to a filter belt traveling speed operating circuit 40 through a data line D1 and the detected output obtained from the sensor for detecting the high level is applied to the filter belt traveling speed operating circuit 40 through a data line D2. The layer thickness or level of the sludge deposited on the filter belt is determined by a combination of the logical outputs obtained through these data lines D1 and D2 from the sensors S1' and S2', respectively. For example, if and when the outputs from the data line D1 and D2 are both the logic zero, then this means that the level is lower than a predetermined lower limit level and thus the concentration is too small. If and when the output from the line D1 is the logic one and the output from the line D2 is the logic zero, then the level is in the predetermined normal range and accordingly the concentration is proper state. If and when the outputs from the lines D1 and D2 are both the logic one, the level is higher than the predetermined upper limit level and accordingly the concentration of the sludge is too high. An additional sensor, not shown, may be provided for the purpose of detecting an abnormally high level that makes the control. If such an additional level sensor is provided, then the abnormally high level detected output is applied to a coagulating agent dosage operating circuit 50 through the data line D3. Detection of such an abnormally high level indicates an abnormal condition. The embodiment is adapted such that in the case of such abnormal condition the operation deviates from the original sequence so that the dosage of the coagulating agent is exceptionally increased, deviating from the predetermined functional relation. A further abnormal, highest level sensor, not shown, may be provided for the purpose of instantaneously detecting the extremely abnormally highest level for stopping the machine, whereby overrunning of the sludge from the side wall can be avoided.

The above described filter belt traveling speed operating circuit 40 is responsive to the digital signals supplied through the data lines D1 and D2 to make an arithmetic operation to evaluate the traveling speed of the filter belt in accordance with the predetermined program. The filter belt traveling speed as evaluated by the filter belt traveling speed operating circuit 40 is provided in the form of an analog output. The analog output is applied to an eddy current coupled control motor M, for example, for controlling the travel speed of the belts. The filter belt traveling speed thus evaluated by the filter belt traveling speed operating circuit 40 is further applied to the coagulating agent dosage operating circuit 50, for arithmetically evaluating the dosage of a coagulating agent in accordance with a function which has been stored in advance. The dosage thus determined is used to control an agent supply pump 16, such as an eddy current coupled control pump including a control plate. When the belt pressure filter is to be started, the sludge supply amount, the filter belt traveling speed and the coagulating agent dosage can be manually entered through a typewriter 70, for example. The sludge supply amount is applied through a sludge amount operating circuit 60 to a sludge supply pump 8 for controlling the operation of the pump 8. Since the embodiment of the present invention has been adapted such that the sludge supply amount may be constant, inherently the sludge supply amount operating circuit 60 can be dispensed with; however, preferably the circuit 60 is provided in preparation for an occurrence of an abnormal situation. To that end, the output from the coagulating agent dosage operating circuit 50 is applied to the sludge supply amount operating circuit 60. Such an abnormal situation could occur in which a coagulating agent dosage merely exceeding a predetermined amount is not sufficient to eliminate poor coagulation, when the amount of supplied sludge must be decreased.

Figure 5:
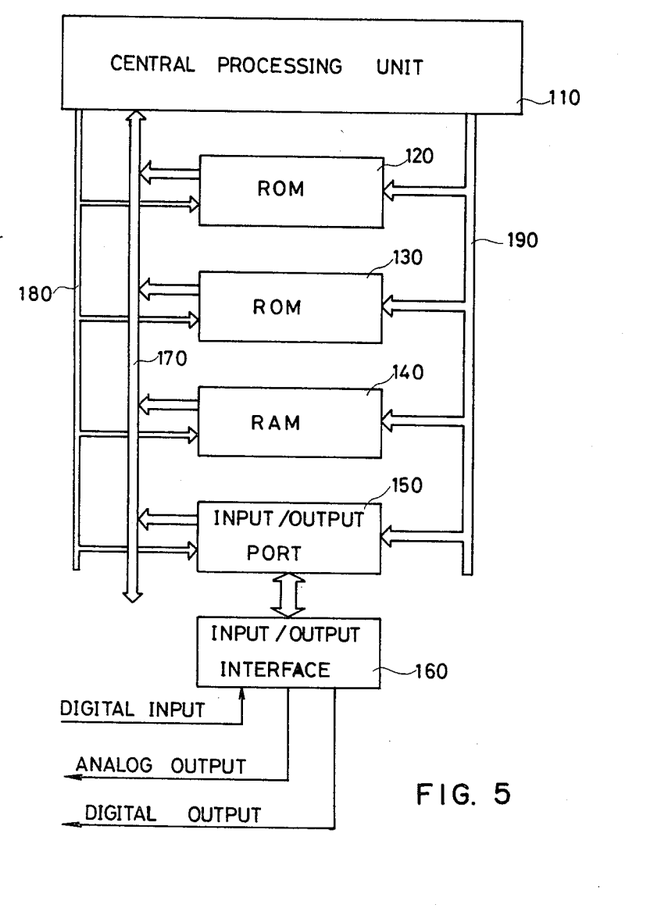
FIG. 5 is a block diagram showing an outline of a computer portion shown in FIG. 4.

FIG. 5 is a block diagram showing an outline of the computer portion of FIG. 4. Basically, the computer comprises a central processing unit 110, a first read only memory 120 for storing a predetermined program, a second read only memory 130 for storing predetermined functions for operating the dosing of a coagulating agent, a random access memory 140 for storing data, and an input/output port 150. Digital input signals being obtained from the belt pressure filter, i.e. the filter running signal, the automatic/manual signal of the filter, the abnormal high level signal, the high level detected signal, and the low level detected signal; analog outputs supplied to the belt pressure filter, i.e. the digital outputs indicating the filter belt running speed operating amount, the coagulating agent flow rate operating amount, and the sludge flow rate operating amount, and a stop command of the filter due to abnormality, are transferred through the input/output interface 160 and the data bus 170 for communication with the central processing unit 110, the read only memories 120 and 130, the random access memory 140 and the input/output port 150. A control bus 180 and an address bus 190 are provided among the central processing unit 110, the read only memories 120 and 130, the random access memory 140 and the input/output port 150. More specifically, the above described first read only memory 120 is used to store the program shown in FIGS. 6A and 6B to be described below and the second read only memory 130 is used to store predetermined functions as shown in FIG. 3 for dosing of a coagulating agent. On the other hand, the random access memory 140 is used as a storage for data being transferred. The central processing unit 110 performs a processing operation in accordance with the program stored in the read only memory 120.

Figure 6A:
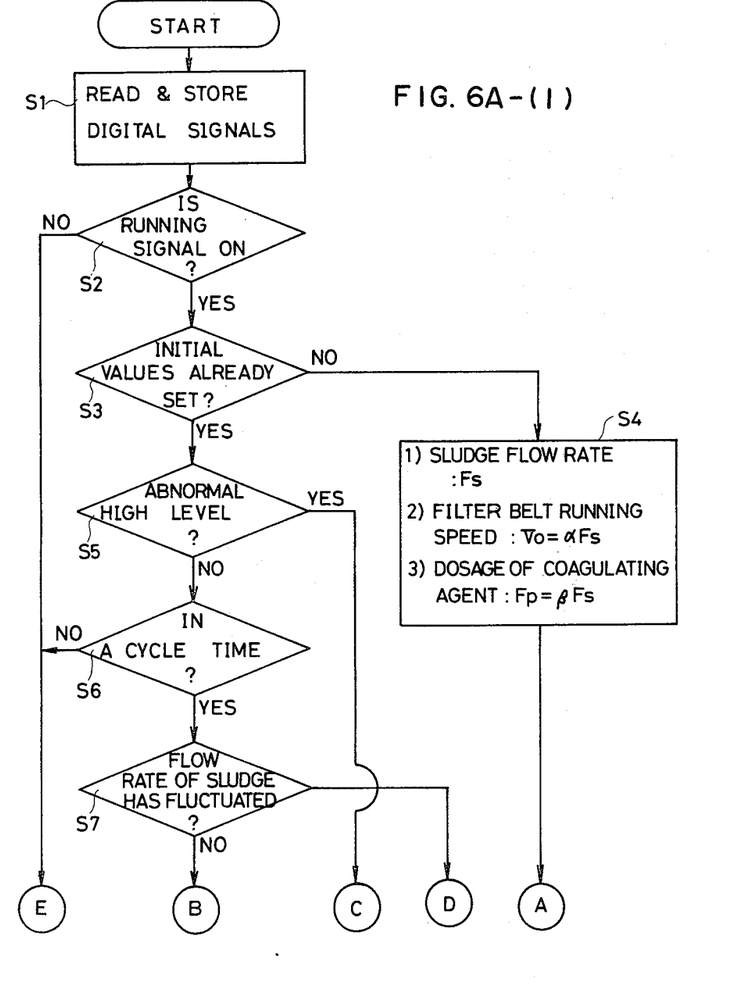
FIG. 6A is a flow diagram for depicting a control operation of the belt pressure filter.

FIG. 6A is a flow diagram for explaining the controlling operation of the belt pressure filter. When the program starts, at the step S1 the digital signals as entered are read out and stored in the random access memory 140 (FIG. 5). These digital signals comprise the filter running signal for indicating whether the filter is in operation, and three level signals being detected by the level meter 34 shown in FIG. 1, i.e. the abnormal high level detected signal, the high level detected signal, and the low level detected signal. The last mentioned level detected signals are each represented as the logic one signal obtained when each of the corresponding levels is detected. Based of the thickness of an actual sludge deposit or layer on the belt, any one of the above described three levels is detected in a normally controlled range. More specifically, these three levels comprise (1) the level lower than the low level, (2) the level between the low level and the high level, and (3) the level higher than the high level. In the case of the first mentioned level, the outputs of the low level sensor S1' and the high level sensor S2' are both the logic zero. In the case of the second mentioned level, i.e. the intermediate level, the output of the low level sensor S1' is the logic one and the output of the high level sensor S2' is the logic zero. In the case of the third mentioned level, i.e., in the case of the level higher than the high level, the outputs of the low level sensor S1' and the high level sensor S2' are both the logic one. In the above described step S1 a combination of such logical signals is obtained and stored in the random access memory until the following cycle. Then in step S2 it is determined whether the running signal of the belt pressure filter is ON. If the filter runs, the running signal is ON and therefore the program proceeds to the step S3. In the step S3 it is determined whether the initial values of the sludge supply flow rate, the filter belt running speed and the dosage of the coagulating agent have been set. In practice the initial values are set manually after the running signal becomes ON at the beginning. Accordingly, since the initial values have not been set in the cycle at the start, the program proceeds to the step S4. In the step S4 information necessary for setting of the initial values is entered manually by means of the typewriter 70 shown in FIG. 4. Usually, only the information concerning the sludge flow rate is manually set by means of a typewriter and the like for the purpose of setting the initial values. The set value of the sludge flow rate is applied to the filter belt running speed operating circuit 40 and the coagulating agent dosage operating circuit 50 in FIG. 4. The initial value of the filter belt running speed and the dosage of the coagulating agent are proportional to the sludge flow rate as manually set. The respective proportion constants $\alpha$ and $\beta$ may be stored in a memory, for example in the read only memory 130 or alternatively they may be stored in the random access memory using a typewriter and the like. The necessary initial values are thus set in step S4. After the initial values are set, the program proceeds to step S15 whereby the analog outputs based on the set initial values are obtained.

In the cycles after the initial values are set, the program proceeds from the step S3 to the step S5. In step S5 it is determined whether the thickness of the sludge layer deposited on the filter belt 2 shown in FIG. 1 is at an abnormally high level, i.e. the concentration of the sludge is abnormally high. The step S5 is aimed to detect an abnormality and usually the level of the sludge as deposited is within any one of the above described three level ranges. Accordingly, in a normal case, the program proceeds from the step S5 to the step S6 which determines whether the operation is in a cycle time for controlling the filter belt traveling speed. Usually, this time cycle has been set to an arbitrary time period of 30 to 300 seconds. For example, assuming that the cycle time has been set to 30 seconds, then a control operation of the filter belt traveling speed is made once every 30 seconds. In step S6 it is determined whether the operation has reached such control cycle time, if so, the program proceeds to step S7. In step S7 it is determined whether the flow rate of the sludge being supplied has fluctuated. Since usually the sludge supply amount has been set to a constant value, no fluctuation occurs in the sludge supply amount, as long as a normal operation continues. In this context, step S7 is aimed to detect an abnormality of the filter. Following the step S7, the program proceeds to the step S8. In the step S8 an arithmetic operation is performed to evaluate the traveling speed of the filter belt based on the thickness of the sludge as read and stored in the previous cycle and the thickness of the sludge layer is currently read out. The detail of the step S8 for evaluating the traveling speed of the filter belt will be described below in more detail with reference to FIG. 6B. When the traveling speed of the filter belt is thus evaluated, then the program proceeds to the step S9, wherein it is determined whether the traveling speed of the filter belt has increased three times consecutively. The number of three times is by way of an example and the number may be larger than that. In the embodiment shown, there are three levels that may be detected by the level meter 34 and the speed has been controlled in response to a fluctuation among these three levels. When the level increases the speed is accordingly increased and vice versa, according to the embodiment shown, and therefore the fact that the speed is increased three times consecutively means that the concentration of the sludge is too high for an accelerating control of the filter belt traveling speed to follow. In this context, the step S9 may also be said to detect an abnormality of the filter. In a normal case, the number of consecutive increases of the speed would be two at the most, as described above, and therefore the program then proceeds to the step S10. In step S10 it is determined whether the traveling speed of the filter belt is lower than a predetermined abnormal value VH. In other words, in a normal control, the traveling speed of the filter belt has been restricted to be smaller than the predetermined abnormal value VH. Accordingly, the step S10 is also aimed at detecting an abnormality of the filter. Considering a normal case, therefore, the program proceeds to the following step S11 which determines whether an operation is in a control cycle time for injection of a coagulating agent. This control cycle time has been usually set to an arbitrary time period of 10 to 120 minutes. Assuming that the cycle time has been set to a time period of 10 minutes, an injection or dosing control of the coagulating agent is made every ten minutes. If and when the operation has reached the control cycle time, the program then proceeds from the step S11 to the step S12. In step S12 an arithmetic operation is performed to evaluate the dosage of the coagulating agent. The agent to be evaluated, i.e. the injection amount or dosage $F_p$ of the coagulating agent, can be calculated by the following equation:

$$F_p = V \times f(V/F_s)$$

V is the traveling speed of the filter belt in the current cycle time as calculated in Step S8, $f(x) = fV/F_s$ is a function of the sludge concentration and the optimum dosage, which is determined in advance through experimentation and is shown in FIG. 3. $F_s$ is the sludge flow rate as shown in Step 4 in FIG. 6A.-(1). The information concerning this function has been stored in advance in the read only memory 130 shown in FIG. 5. The values V and $F_s$ are stored in the random access memory 140 in FIG. 5. The information concerning the dosage of the coagulating agent evaluated in step S20 is withdrawn during the following step S13 as an analog output. The information concerning the filter belt traveling speed calculated during the previously described step S8 is also withdrawn in step S13 as an analog output. These analog outputs thus obtained are applied to the belt pressure filter control, as described above.

Thus the program proceeds through the steps for a normal operation as described in the foregoing. An abnormal situation as determined by the above described abnormality determining steps will now be described. If and when it is determined in step S7 that there is a fluctuation in the sludge flow rate, the program proceeds from step S7 to step S14. In step S14 the filter belt traveling speed Vn and the coagulating agent dosage Fpn are calculated in accordance with the following equations:

$$Vn = Vn-1 \times Fs_n/Fs_{n-1}$$

$$Fp_n = Fp_{n-1} \times Fs_n/Fs_{n-1}$$

where n is a suffix denoting that the value is a current value and (n−1) is a suffix denoting that the value is a value of the previous cycle. If and when the filter belt traveling speed has become larger than the predetermined abnormal speed VH in step S10, then the program proceeds from step S10 to step S15. In step S15 the coagulating agent dosage is increased temporarily. The purpose of this dosage increase is to increase the coagulation ratio of the sludge by, thereby to decrease the concentration of the sludge, if and when the concentration of the sludge is too high to be handled only by a following control of the filter belt traveling speed. Since an unlimited increase of the dosage of the coagulating agent is uneconomical, a timer is started in step S15 concurrently with the start of the increase of the coagulating agent dosage, so that a period during which the coagulating agent dosage is increased, is limited to a predetermined time period only. Following the step S15, in step S16 it is determined whether the time period set by the above described timer has run out. Since at the beginning the above described time period has not run out, the program proceeds to step S13. If and when an increase of the coagulating agent dosage is still continuing even after the above described preset time period, this means that the increase of the coagulating agent dosage alone cannot correct the situations and therefore in the following step S17 the flow rate of the sludge being supplied is decreased. In following step S18 it is determined whether the flow rate of the sludge being supplied has become smaller than a predetermined minimum supply amount. If and when the flow rate of the sludge has decreased to be smaller than the predetermined minimum value, then the automatic control cannot follow and therefore in the following step S19 the operation is brought to a stop by way of an abnormality stop.

Figure 6B:
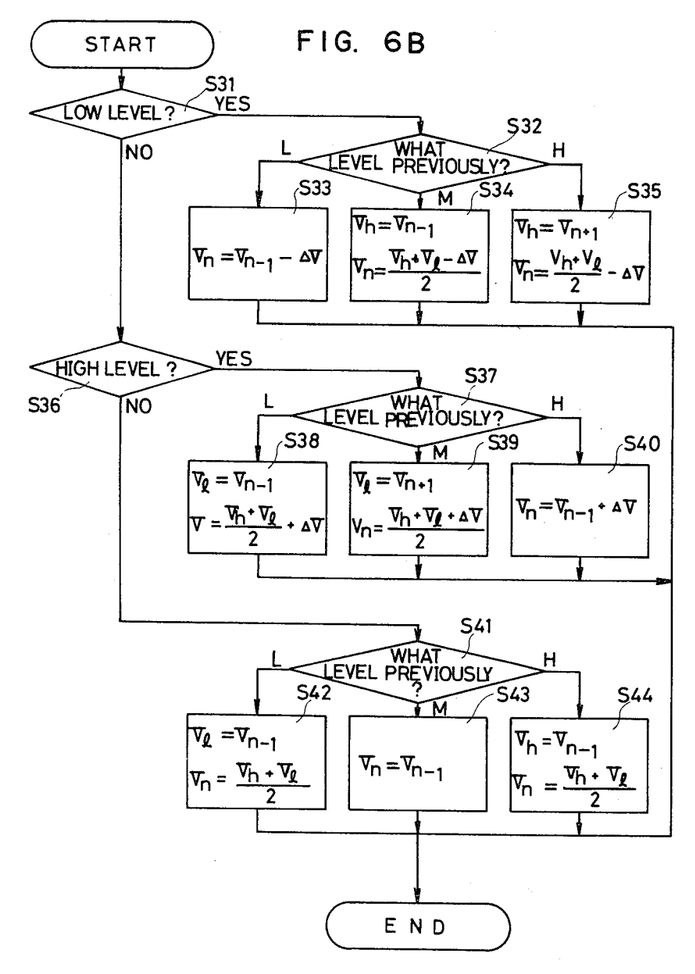
FIG. 6B is a flow diagram showing in more detail the operation steps for controlling the filter belt traveling speed in FIG. 6A.

FIG. 6B is a flow diagram showing the detail of the operation for evaluating the traveling speed of the filter belt in step S8 shown in FIG. 6A. The flow diagram shown in FIG. 6B is adapted to determine whether the level is lower than the low level, higher than the high level, or in the level between the low and high levels, hereinafter referred to as an intermediate level. These three levels are determined by a logical combination of the outputs obtained from the low level sensor S1' and the high level sensor S2', and then to determine what was the level in the previous cycle, thereby to evaluate the traveling speed of the filter belt based on the current level and the previous level. Therefore, before describing in conjunction with FIG. 6B, various operation symbols used in the flow diagram of FIG. 6B will be described. $V_N$ is a target value of the traveling speed of the filter belt in the case where t=N. Vh is the latest value of the traveling speed of the filter belt when a change occurs from the high level to the low level or from the intermediate level to the low level, i.e. a change of level decrease occurs. V1 is the latest value of the traveling speed of the filter belt when a change occurs from the low level to the high level or from the intermediate level to the high level, i.e. when a level increases occurs. These latest values are stored in the random access memory. ΔV is a speed modification constant or a speed adjustment constant and is a predetermined relatively small value. The constant ΔV is stored in advance in the read only memory. A downward change of the level means that the traveling speed of the filter belt is too high, while an upward change of the level means of the traveling speed of the filter belt is too small. With the foregoing description in mind, the flow diagram shown in FIG.6B will now be described.

First, the case will be considered when the detected level of the sludge layer as deposited is smaller than the predetermined low level:

In such a situation, the program proceeds from the step S31 for determining whether the level is smaller than the low level to the step S32 which determines what the level was in the previous cycle. The level in the previous cycle has been stored in the random access memory 140 in step S1 in FIG. 6A. If and when the previous level is smaller than the low level, then the program proceeds to step S33. In step S33, the target value $V_N$ of the traveling speed of the filter belt at the current cycle is determined on the basis of the condition that both the current level and the previous level are smaller than the low level. More specifically, the fact that the program proceeds to the step S33 means that the traveling speed of the filter belt in the previous cycle is too large. Therefore, in step S33 the following arithmetic operation is performed:

$$V_N = V_{N-1} - \Delta V$$

More specifically, since the traveling speed $V_{N-1}$ of the filter belt in the previous cycle is too large, the speed is decreased by the speed modification constant ΔV. The speed $V_N$ thus determined is stored in the random access memory 140 shown in FIG. 5. If and when the level detected and stored in the previous cycle is the intermediate level, then the program proceeds from step S32 to step S34. Then in step S34 the following arithmetic operation is performed:

$$V_h = V_{N-1}$$

$$V_N = (V_n + V_1 - \Delta V)/2$$

The fact that the program proceeds from step S36 to step S34 means that the level has decreased from the intermediate level in the previous cycle to the low level in the current cycle. Accordingly, it is necessary to increase the target value of the traveling speed of the filter belt in the current cycle for the purpose of controlling the traveling speed of the filter belt. To that end, the value obtained by subtracting a half of the speed modification constant $\Delta V$ from the average value of the latest value of the traveling speed of the filter belt when the level is decreased and the latest value of the traveling speed of the filter belt when the level is increased, is determined as the current traveling speed of the filter belt. Furthermore, the latest traveling speed of the filter belt, when the level is decreased, is the traveling speed $V_{N-1}$ of the filter belt determined in the previous cycle. The reason is that the level has been decreased from the previous intermediate level to the level lower than the current low level. V1 is the latest traveling speed of the filter belt when the level is increased. Thus, the traveling speed of the filter belt is adjusted by adopting the average value of the traveling speeds of the filter belt when the level is increased to the latest value and the level is decreased to the latest value. The reason why $\Delta V/2$ is subtracted is that the decrease of the level was one step, i.e. from a level down from the previous intermediate level to the current low level. If and when the previous level is the high level, an abrupt level decrease of two steps must have occurred from the high level to the low level and in this case the following arithmetic operation is performed in step S35:

$$V_N = (V_h + V_l)/2 - \Delta V$$

Since the level decrease from the previous level to the current level is abrupt at that time, in other words since the previous traveling speed of the filter belt is too fast, the speed modification constant $\Delta V$ is subtracted for the purpose of adjustment of the speed. Thus, if there occurs a change of the level, basically the average value of the latest traveling speeds of the filter belt when the level decreases and increases occur and in addition the speed modification component is halved in accordance with the extent of the level decrease.

Second, the case will be considered when the level of the sludge as deposited is higher than the high level;

In this case the program proceeds from the step S31 through the step S36 to the step S37. In step S37 it is determined what is the level detected at the previous cycle in the same manner as described above for step S32. If and when the level detected by the previous cycle is lower than the low level, then the program proceeds to the step S38 which means that there occurred a level increase by two steps from the low level in the previous cycle to the level higher than the high level. In other words, this means that the traveling speed of the filter belt in the previous cycle was too slow. Accordingly, the target value of the traveling speed of the filter belt in the current cycle is determined in step S38 in accordance with the following equation:

$$V_N = V_h + V_l/2 + \Delta V$$

The fundamental idea is the same as that in the case of the previously described first case or mode and the average value of the latest traveling speeds of the filter belt on the occasion of the level increase and the level decrease is evaluated, whereupon the speed modification constant is added thereto, because there occurred a level increase of two steps. If and when the detected level in the previous cycle is the intermediate level, then the program proceeds from the step S37 to the step S39. This means that there occurred a gradual level increase from the intermediate level in the previous cycle to the high level in the current cycle. Therefore, in step S39 the target value of the traveling speed of the filter belt in the current cycle is obtained by adding a half of the speed modification constant to the average value of the respective latest traveling speeds of the filter belt as in the previously described level increase and decrease. It will be appreciated that V1 would become a value corresponding to the traveling speed of the filter belt in the previous cycle, i.e. $V_{N-1}$, because a level increase occurs in each of the steps S38 and S39. If the level detected in the previous cycle is higher than the high level, then both levels in the previous and current cycles are at the high level. This means that the traveling speed of the filter belt in the previous cycle was not high enough to decrease the level. Therefore, in step S40 a target value of the traveling speed of the filter belt in the current cycle is obtained by adding the speed modification factor $\Delta V$ to the traveling speed of the filter belt in the previous cycle.

Third, the case will be considered when the level of the sludge as deposited is at the intermediate level:

In this case the program proceeds through the steps S31 to S36 to the step S41. In step S41 it is determined what was the level in the previous cycle in the same manner as described in conjunction with the previous steps S32 and S37. If the level in the previous cycle is lower than the low level, the program proceeds to step S42 which means that there occurred a level increase from the level lower than the low level in the previous cycle to the intermediate level in the current cycle. Accordingly, V1 is the traveling speed of the filter belt in the previous cycle, i.e. $V_{N-1}$. Since the level in the current cycle is the intermediate level, it is not necessary to make any speed modification and simply a target value of the traveling speed of the filter belt in the current cycle is obtained by adopting the average value of the respective latest traveling speeds of the filter belt when there was a level increase or decrease. If and when the level in the previous cycle is at the intermediate level, then there is no level change between the previous and the current cycles and therefore the traveling speed of the filter belt in the current cycle may be the same as the traveling speed of the filter belt in the previous cycle as in step S43. If and when the level in the previous cycle is higher than the high level, the program then proceeds to the step S44, which means that there occurred a level decrease from the high level in the previous cycle to the intermediate level in the current cycle. Accordingly, Vh is the traveling speed of the filter belt in the previous cycle, i.e. $V_{N-1}$. The traveling speed of the filter belt in the current cycle is, as in the case of step S42, the average value of the respective latest traveling speeds of the filter belt when there was a level increase or decrease.

In view of the foregoing, the target value of the traveling speed of the filter belt in the current cycle is determined based on the level of the deposited sludge detected in the current cycle and the level of the sludge detected and stored in the previous cycle and in consideration of the degree of a level change and the direction of a level change between the levels in the previous and current cycles. In particular, according to the FIG. 6B embodiment, the average value of the respective latest traveling speeds of the filter belt when there was a level increase or decrease is used as a reference without causing an abrupt change of the traveling speed and therefore a smooth speed control can be achieved.

Figure 7:
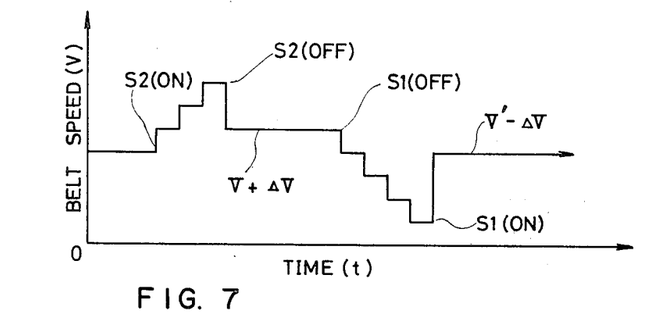
FIGS. 7 to 9 are time charts each showing a control state for depicting another embodiment for controlling the filter belt traveling speed.
Figure 8:
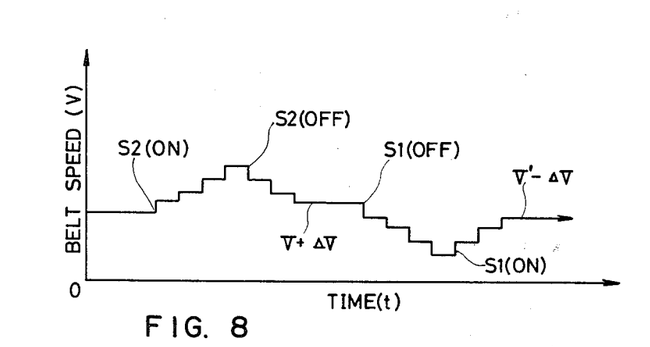
Figure 9:
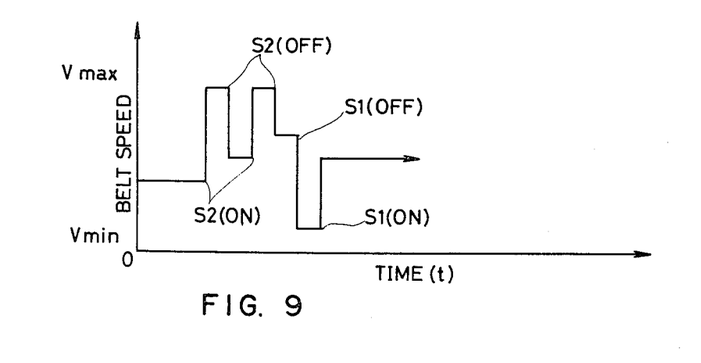

FIGS. 7 to 9 are time charts showing a control state for describing another embodiment for evaluating the traveling speed of the filter belt. Contrary to the embodiment of FIG. 6B described above, in the embodiment of FIG. 7, if and when the detected level has become the high level, i.e. the detected output of the high level sensor S2' becomes the logic one, the traveling speed of the filter belt is increased stepwise by adding the speed modification constant ΔV to the traveling speed of the filter belt in the previous cycle. On the other hand, if and when the level is decreased from the high level to the intermediate level due to the increase of the traveling speed of the filter belt, i.e. when the digital output of the high level sensor S2' becomes the logic zero, the speed is decreased to the previously described traveling speed of the filter belt when the high level was reached, i.e. to the intermediate set speed (V+ΔV). On the other hand, when the detected level becomes lower than the low level, i.e. the digital output of the low level sensor S1' becomes the logic zero, the speed is stepwise decreased by the speed modification constant ΔV from the traveling speed of the filter belt at that time. When the level is increased to reach the intermediate level due to the decrease of the traveling speed, i.e. when the output of the low sensor S1' becomes the high level, the speed is increased to the traveling speed at the time when the level decreased to the latest value at the present time, i.e. to the intermediate set speed (V'−ΔV).

The above described embodiment of FIG. 7 was adapted such that the speed is increased or decreased abruptly to the intermediate set speed. On the other hand, embodiment of FIG. 8 is adapted to change the speed stepwise by the speed adjustment constant ΔV.

The embodiment of FIG. 9 is adapted such that an allowable maximum speed (Vmax) and an allowable minimum speed (Vmin) are stored in advance in the read only memory or the random access memory and when the output of the high level sensor S2' becomes the logic one of the traveling speed is at once changed to the maximum speed, whereupon when the detected level becomes the intermediate level, i.e. to the set range, the speed is changed from the maximum speed to the intermediate set speed and conversely when the detected level becomes lower than the low level the traveling speed of the filter belt is at once decreased to the minimum speed, whereupon the speed is changed to the intermediate set speed at the time when the intermediate level, i.e. when the output from the low level sensor S1' becomes the logic one. According to the control function of the traveling speed of the filter belt as shown in FIGS. 6B to 9, the traveling speed of the filter belt is adjusted such that, if the thickness of the material deposited on the filter belt to be detected, i.e. the detected level, assumes a value other than the intermediate level or a set range, the above described detected level may be changed to the intermediate level. If the level is to be changed to the intermediate level or a set range the traveling speed of the filter belt is always adjusted to the intermediate set speed. Accordingly, if the detected level becomes higher than the high level, for example, even if the traveling speed of the filter belt is increased so that the detected level may be changed to the intermediate level, if such state is maintained, the detected level would pass through the intermediate level to be lower than the low level. However, according to the present invention, when the detected level becomes the intermediate level, the level is automatically controlled so as to prevent that the intermediate level is passed through by decreasing the speed to a speed smaller than the speed at that time and larger than that before the adjustment.

Figure 10:
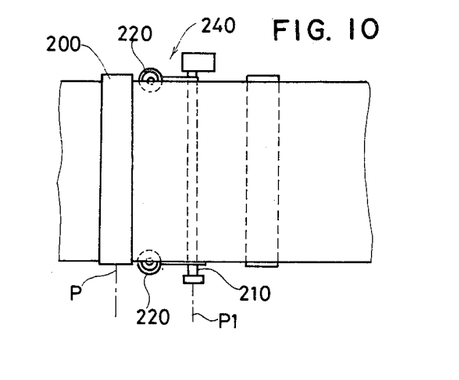
FIG. 10 is a view showing an arrangement of means for detecting the material being processed coming from the filter belt for the purpose of assuring a certain operational state of the present belt pressure filter.
Figure 11:
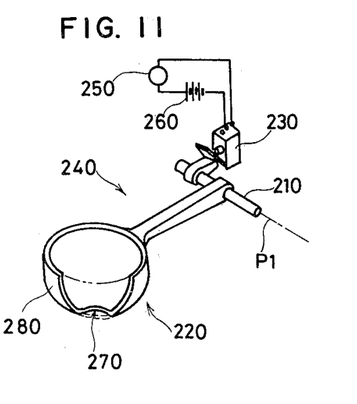
FIG. 11 is a perspective view showing an outline of the detecting means of FIG. 10.

FIGS. 10 and 11 are views showing an arrangement of an apparatus for detecting a material being processed leaking from between the filter belts for assuring the operation of the present belt pressure filter. As described in conjunction with FIG. 1, the shear dewatering zone C comprises a plurality of rollers disposed in parallel and in a zigzag fashion such that the diameter of each roller is decreased from the upstream to the downstream as viewed in the traveling direction of the filter belts 2 and 4. A rotating shaft 210 is provided in the vicinity of a roller 200 at the downstream end for tilting about the axis P1 in parallel with the rotation axis P of the roller 200. Material receiving members 220 are secured to the rotation shaft 210. The material receiving members 220 are positioned below and adjacent to both side edges of the filter belts 2 and 4. A limit switch 230 is provided at one end of the above described shaft 210, so that any material leaking from both sides of the filter belts 2 and 4 is received in the members 220. The limit switch 230 is operated by the weight of the material received in the receiving members 220. Referring to FIG. 11, the structure of the detecting means 240 will be described in more detail. The receiving member 220 comprises a cup 280 having a water leaking aperture 270 at the bottom thereof. The cup 280 is connected to the above described shaft 210. When the material received in the cup 280 exceeds a predetermined weight, the above described shaft 210 is rotated counterclockwise about the axis thereof. As the shaft 210 is rotated, the limit switch 230 closes a circuit with a power supply 260 and an alarm device 250. The purpose of the water leaking aperture 270 in the cup 280 is to prevent any leaked liquid flowing into the cup 280 during normal operation from remaining in the cup 280 thereby to prevent an undesirable closing of the limit switch 230.

When more material is received in the cup 280 than can flow out the limit switch 230 closes 260, the circuit for the alarm device 250 through the power supply whereby an alarm is given to notify an operator of an excessive leakage. The operator can then manually adjust the supplied amount of the coagulating agent and the amount of supplied material, he can also take any necessary steps to adjust the traveling speed of the filter belts 2 and 4.

Although a cup-like vessel was shown as an example of the receiving members 220 in the embodiment shown in FIGS. 10 and 11, it is to be pointed out that the geometry of the cup is not limited to such a structure. Furthermore, although in the above described embodiment the detecting means 240 was disposed at the end of the shear dewatering zone C where a leaking phenomenon is necessarily caused due to the maximum pressure between the roll belts at that zone, the detecting means may be disposed at any other place along the belts, such as the start portion or the intermediate portion of the shear dewatering zone C.

As described in detail in the foregoing, according to the present invention the traveling speed of the filter belts is controlled following a change of the concentration of the sludge being supplied and the optimum dose of a coagulating agent can be determined, while the amount of the supplied material to be processed or the sludge is maintained constant. Therefore, the water content of a cake as finally obtained as a result of a dewatering process can be maintained low and constant, without any need for supplying excessive quantities of coagulating agent.

It is to be pointed out that the embodiments described in the foregoing were shown only by way of example and various changes and modifications can be made by those skilled in the art without departing from the scope and spirits of the prevent invention. For example, although a level meter was employed for the purpose of detecting the concentration of the sludge in the above described embodiments, any other types of concentration meter may be used. The concentration may be measured by using an ultrasonic wave or gamma rays and ascertaining an attenuation thereof. The concentration could also be measured by using a scattered light beam.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. A belt pressure filter including a gravity dewatering zone for dewatering a material being dewatered by gravity, and in a forced dewatering zone for forced dewatering the material being processed through external pressure, comprising: endless filter belt means arranged to travel through said gravity dewatering zone and through said for forced dewatering zone, material supply means for supplying said material being processed to said filter belt means in said gravity dewatering zone, layer thickness information providing means operatively located for sensing the thickness of a layer of material deposited onto said filter belt means by said material supply means for providing information representing the layer thickness of said material being supplied by said material supply means for processing, and filter belt travelling speed control means operatively connected to said layer thickness information providing means for controlling the traveling speed of said filter belt means so that the filter belt speed is substantially proportional to said layer thickness.

2. The belt pressure filter in accordance with claim 1, wherein said filter belt traveling speed control means controls the traveling speed of the filter belt means at predetermined cycles within a sequence of operating cycles.

3. The belt pressure filter in accordance with claim 1, wherein said layer thickness information providing means are located adjacent to said gravity dewatering zone for detecting the layer thickness of said material deposited on said filter belt means in said gravity dewatering zone.

4. The belt pressure filter in accordance with claim 3, wherein said layer thickness information providing means comprise a first level sensor for detecting that the layer thickness is smaller than a predetermined lower limit thickness of a layer of said material deposited on said filter belt means, a second level sensor for detecting that the thickness is larger than a predetermined upper limit thickness of said material deposited on said filter belt means, and means for processing said information representing the layer thickness of said material by combining logical outputs of said first and second level sensors for providing a control signal for said filter belt traveling speed control means.

5. The belt pressure filter in accordance with claim 4, wherein said filter belt traveling speed control means is operatively connected to said second level sensor for responding to the information representing a layer thickness larger than said upper limit thickness obtained from said thickness detecting means for increasing the traveling speed of said filter belt means so that the thickness of said material deposited on said filter belt means may become an intermediate thickness between said lower limit thickness and said upper limit thickness, said filter belt traveling speed control means being also operatively connected to said first level sensor for responding to said information representing a layer thickness smaller than said lower limit thickness for decreasing the traveling speed of said filter belt so that the layer thickness of said material deposited on said filter belt means may become an intermediate thickness between said lower limit thickness and said upper limit thickness.

6. The belt pressure filter in accordance with claim 5, wherein said filter belt traveling speed control means comprises first information storage means for storing information representing the layer thickness of said material as detected by said level sensors at every control cycle, thickness direction of change determining means for comparing the information representing the thickness in a previous control cycle stored in said first storage means and the information representing the thickness detected in a current control cycle for determining the direction of change of the layer thickness between said previous control cycle and said current control cycle, second information storage means responsive to the thickness direction of change determining output from said thickness direction of change determining means for storing the filter belt traveling speed during said previous control cycle in said second information storage means, arithmetic operation means for evaluating information representing an intermediate speed information based on the latest filter belt traveling speed when a change in the thickness increasing direction occurs and the filter belt traveling speed when a change in the thickness decreasing direction occurs as stored in said second information storage means, and intermediate speed control means responsive to said intermediate speed information obtained from said arithmetic operation means for controlling the traveling speed of said filter belt means to become said intermediate speed.

7. The belt pressure filter in accordance with claim 6, which further comprises third information storage means for storing information representing a predetermined relatively small speed value, and wherein said filter belt traveling speed control means comprises adding means responsive to the thickness increasing change output from said thickness change direction determining means for adding said predetermined relatively small speed value stored in said third information storage means to an intermediate speed value and responsive to the thickness decreasing change output from said thickness change direction determining means for subtracting said predetermined relatively small speed value stored in said third storage means from an intermediate speed value.

8. The belt pressure filter in accordance with claim 1, which further comprises coagulating agent dosing means for adding a coagulating agent to said material being processed for the purpose of coagulating said material in said gravity dewatering zone, function storing means for storing a predetermined function correlating said layer thickness information of said material on said filter belt means and an optimum dosage of said coagulating agent, coagulating agent dosage operating means responsive to said layer thickness information obtained from said layer thickness information providing means for evaluating the amount of said coagulating agent based on said predetermined function stored in said function storing means, and coagulating agent supply control means responsive to the information concerning dosage of said coagulating agent determined by said coagulating agent dosage operating means for controlling the amount of supplied coagulating agent so that the amount corresponds to a determined coagulating agent amount.

9. The belt pressure filter in accordance with claim 1, which further comprises detecting means for detecting a level of material deposited on said filter belt means overruns from the filter belt means.

10. A belt pressure filter including a gravity dewatering zone for dewatering a material by gravity, and a forced dewatering zone for a forced dewatering of the material by external pressure, comprising: an endless filter belt arranged to travel at a constant speed through said gravity dewatering zone and said forced dewatering zone, material supply means for supplying said material to said gravity dewatering zone, coagulating agent dosing means for adding a coagulating agent to said material for the purpose of coagulating said material said coagulating agent being supplied to said gravity dewatering zone, means for providing an information representing a solids concentration in said material, said solids concentration information providing means being operatively coupled to said material supply means, function information storing means for storing a predetermined function between the solids concentration of said material and the optimum dosage of said coagulating agent, coagulating agent dosage operating means responsive to said solids concentration information for evaluating the amount of said coagulating agent based on said predetermined function stored in said function information storing means to provide a coagulating agent dosage information, and coagulating agent supply control means responsive to the coagulating agent dosage information for controlling said coagulating agent supply means so that the supplied amount of coagulating agent corresponds to a determined quantity of coagulating agent.

11. The belt pressure filter in accordance with claim 10, wherein said solids concentration representing information providing means comprises thickness detecting means for detecting the thickness of a layer of said material deposited on said filter belt in said gravity dewatering zone whereby the detected layer thickness represents the solids concentration in said material layer.

12. The belt pressure filter in accordance with claim 11, wherein said thickness detecting means comprises a first level sensor for detecting that the layer thickness is smaller than a predetermined lower limit thickness of said material deposited on said filter belt, a second level sensor for detecting that the layer thickness is larger than a predetermined upper limit thickness of said material deposited on said filter belt, and means for determining said information representing the thickness of said material by a combination of the logical outputs of said first and second level sensors.

13. The belt pressure filter in accordance with claim 10, which further comprises detecting means for detecting the level of said material on said filter belt when said material runs off the filter belt.

* * * * *

UNITED STATES PATENT AND TRADEMARK OFFICE
CERTIFICATE OF CORRECTION

PATENT NO. : 4,341,628

DATED : July 27, 1982

INVENTOR(S) : Susumu Fujinami et al

It is certified that error appears in the above-identified patent and that said Letters Patent is hereby corrected as shown below:

Claim 1, column 17, line 38, delete "for".

Claim 9, column 19, line 23, after "means" insert --and--;
      column 19, line 24, replace "overruns" by --overrunning--.

Claim 10, column 19, line 35, after "rial" insert --,--.

Signed and Sealed this

Fourth Day of January 1983

[SEAL]

Attest:

GERALD J. MOSSINGHOFF

Attesting Officer    Commissioner of Patents and Trademarks